United States Patent [19]
Ogo et al.

[11] Patent Number: 4,709,198
[45] Date of Patent: Nov. 24, 1987

[54] HIGH-SPEED MACHINING CONTROLLER

[75] Inventors: Kazutaka Ogo; Masahiro Hayashi, both of Nagoya; Takatoshi Suzuki, Anjo; Katsuiku Hokao, Toyota; Akio Asai, Aichi; Takayuki Tsuruhashi, Toyota, all of Japan

[73] Assignees: Kabushiki Kaisha Toyota Chuo Kenkyusho, Aichi; Toyota Jidosha Kabushiki Kaisha, Toyota, both of Japan

[21] Appl. No.: 868,041

[22] Filed: May 29, 1986

[30] Foreign Application Priority Data

May 29, 1985 [JP] Japan ................................. 60-81771

[51] Int. Cl.$^4$ ............................................. G05B 19/24
[52] U.S. Cl. ..................................... 318/571; 318/39; 364/474
[58] Field of Search .................... 318/460, 571, 39; 364/474

[56] References Cited

U.S. PATENT DOCUMENTS

| | | | |
|---|---|---|---|
| 3,095,532 | 6/1963 | Floyd | 318/460 |
| 3,671,840 | 6/1972 | Meyer et al. | 318/39 X |
| 3,681,661 | 8/1972 | Koegel | 318/640 X |
| 3,809,488 | 5/1974 | Sonderegger | 318/460 X |
| 4,496,883 | 1/1985 | Eastcott et al. | 318/460 X |
| 4,626,754 | 12/1986 | Habermann et al. | 318/460 |

FOREIGN PATENT DOCUMENTS 0017027  1/1982  Japan ................................. 318/460
57138558  5/1985  Japan .

Primary Examiner—Benjamin Dobeck
Attorney, Agent, or Firm—Oblon, Fisher, Spivak, McClelland & Maier

[57] ABSTRACT

A high speed machining controller comprises an acoustic emission sensor which is installed in or near a machine for machining a work piece in a high speed and which detects acoustic emission generated during machining a work piece; a signal processing means which is composed of a band-pass filter for passing an element of a frequency band corresponding to the acoustic emission by inputting a signal outputted from the acoustic emission sensor, a rectification circuit for rectifying a signal outputted from said band-pass filter, a peak detection circuit for detecting peak values of the signal outputted from the rectification circuit, and a smoothing circuit for smoothing output signals of said peak detection circuit and for outputting a signal corresponding to the amplitude of the acoustic emission for the purpose of processing the output signal of the acoustic emission sensor to detect its amplitude; a cutting condition discrimination means for judging the cutting condition of a work piece by comparing a detected amplitude of the acoustic emission with a predetermined discrimination value for discriminating the cutting condition of said work piece; and a control means to instruct and control the machining condition including at least the feed speed of a machine tool on the basis of the cutting condition of the work piece.

6 Claims, 19 Drawing Figures

HIGH-SPEED MACHINING CONTROLLER

BACKGROUND OF THE INVENTION

This invention relates to a high-speed machining controller in which an acoustic emission signal is processed and the cutting condition of a machine tool is detected with high accuracy to be ordered and controlled.

Prior Art

For machine tools, e.g., cutting machines for metal molds, there are apparatuses for realizing high-speed machining with high accuracy by controlling cutting conditions including feed speed and cutting depth which have been developed so far. In order to put them into practical use, such devices for judging machining condition (e.g., actual cutting or non-cutting) and for detecting the load for a work piece during machining are required. For example, an apparatus utilizing acoustic emission generated during machining has been heretofore designed. Acoustic emission is a kind of elastic wave (ultrasonic vibration) which is generated when a structural change occurs in a work piece due to the cutting force and the distortion energy is instantaneously released, and this is reflective of the machining condition of a work piece by a cutting tool.

For example, there exists a device for detecting the contact of a tool with a work piece, and the damage of tools (published unexamined patent application Sho 57-138558). The constitution of this device is such that an acoustic emission sensor for detecting damage of tools is attached to a tool supporting member of a machine tool; another acoustic emission sensor for detecting the contact of a tool with a work piece by way of the increase in the output value of acoustic emission when a tool is brought into contact with a work piece which is provided on the work piece supporting member; and the data outputted from both sensors is respectively compared with reference values and the results of these comparison being outputted to the machine tool.

However, prior art provides an incomplete solution and includes the following problems.

(1) In case that the tool damage and the contact between a tool and a work piece are respectively detected by means of signals outputted from acoustic emission sensors (AE sensor), at least two AE sensor are required to distinguish between the tool damage and the contact of a tool with a work piece. In addition, one of the AE sensors is fixed to the work piece supporting member, therefore, the AE sensor must be attached and demounted as work pieces are exchanged. In this case, it is required to select the values outputted from more than two AE sensors to be compared with each corresponding reference value. This selection of the output value should be done on the basis of signals transmitted from a controlling board of a machine tool for selecting the tool damage or the contact between a tool and a work piece. However, the constitution of a circuit for this kind of selection is extremely complicated, therefore, the adjustment is difficult and the number of manufacturing and assembling processes is increased, all of which result in making difficult to fulfill reliability, durablity and maintenability (2) In order to solve the abovementioned problems, and AE sensor has been proposed, which is provided to a work table of a machine tool for detecting tool damage and realizing an ideal control in accordance with the cutting condition by selecting a frequency band in a high S/N ratio. For the purpose of improving the reliability of the output signal of an AE sensor by solving the problem that the value of the output signal is small, such a control system is suggested by utilizing an AE sensor attached to a work table of a machine tool in combination with an vibration acceleration sensor which detects an acceleration vibration signal in a frequency band of high S/N ratio. This system provides high reliability and is not influenced by the processes of attachment and demounting of work pieces, for the AE sensor is attached to a work table. As a result, it becomes possible to relieve an operator from heavy work load, to reduce the work time, and to improve the machining accuracy. Thus, it is now widely used in a number of manufacturing fields. However, this type of system still has a problem. This problem is, that the system requires a vibration acceleration sensor in addition to an AE sensor, and therefore, a logical circuit to process both signals of acoustic emission and vibration acceleration is required. Because of this, the structure becomes fairly complicated, and the manufacturing cost is raised.

SUMMARY OF THE INVENTION

The object of this invention is to solve the abovementioned problems and to provide a high-speed machining controller which enables high speed machining by precisely detecting the machining condition of a work piece by a simple structure utilizing only one AE sensor.

A means to achieve the abovementioned object is hereinafter described in accordance with FIG. 1. The constitution is such that a high-speed machining controller includes an acoustic emission sensor M3 which is installed in a machine tool M2 for machining a work piece M1 in a high speed and which detects the acoustic emission generated during machining a work piece M1; a signal processing means M8 which is composed of a band-pass filter M4 for passing the element of a frequency band corresponding to the acoustic emission by inputting an output signal of the acoustic emission sensor M3, a rectification circuit M5 for rectifying a signal outputted for the band-pass filter M4, a peak detection circuit M6 for detecting peak values of signals outputted from the rectification circuit M5, and a smoothing circuit M7 for smoothing the output signals of the peak detection circuit M6 and for outputting signals corresponding to the strength of acoustic emission, for the purpose of processing the signals outputted from the acoustic emission sensor M3 so as to detect its amplitude; a cutting condition discrimination means M9 for judging the cutting condition of a work piece M1 by comparing the detected amplitude of acoustic emission with the predetermined discrimination value for discriminating the cutting condition of the abovementioned work piece M1; and a control means M10 for instructing and controlling the machining condition including at least the feed speed of a machine tool M2 on the basis of the cutting condition of the work piece M1.

BRIEF DESCRIPTION OF DRAWINGS

The invention may be best understood by reference to the following detailed description of preferred embodiments and the accompanying drawings, wherein like reference numerals denote like elements in which.

DETAILED DESCRIPTION OF PREFERRED EMBODIMENT

The embodiment of the present invention are hereinafter described on the basis of figures.

The high-speed machining controller of this invention has an acoustic emission (AE) sensor M3 in a machine tool M2 for machining a work piece at a high speed, and passes only the frequency element which is corresponding to the acoustic emission generated during machining a work piece M1 through a band-pass filter M4. After that, the controller rectifies the element, detects the peak of the output signal, smoothes the signal, processes the smoothed signal in accordance with the amplitude of the acoustic emission, compares this result with a reference value to judge the machining condition, and then instructs and controls the machining condition including at least the feed speed of the machine tool M2.

The acoustic emission hereupon is regarded as an acoustic radiation caused by the generation and the growth of a defect of the work piece M1. Therefore, the acoustic emission is transformed to a wave in accordance with the following equation of motion and it is propagated to the inside of a work piece regarded as a continuum.

$$\partial^2 u/\partial t^2 = \partial V^2 \cdot \partial^2 u/\partial X^2 \tag{1}$$

In the above equation, displacement of time t (X-axis) of a work piece as a continuum is shown in u (x, y). Generally, the answer of the above equation (1) is;

$$u(x,y) = \sum_{i=1}^{\infty} \{A_i \cdot \cos(i\pi Vt/l) + B_i \cdot \sin(i\pi Vt/l)\} \cdot \sin(i\pi Vt/l) \tag{2}$$

$$V = \sqrt{E/\rho} \tag{3}$$

E ... elastic modulus of a work M1
ρ ... density of a work M1
l ... length of work M1 in the direction of X-axis
Ai, Bi ... constant On the other hand, the speed of this elastic wave is calculated as follows. The longitudinal wave, the transverse wave and the surface area are respectively shown as Vl, Vs and Vr.

$$Vl = \sqrt{E/\rho} = \sqrt{(3K + 4G)/3\rho} \tag{4}$$

$$Vs = \sqrt{G/\rho} = \sqrt{E/\{2\rho(1 + \nu)\}} \tag{5}$$

$$Vr = 0.9 \cdot \sqrt{G/\rho} \tag{6}$$

K ... bulk modulus of a work M1
G ... shear modulus of a work M1
ν ... Poisson ratio While the energy of an elastic wave is proportional to the square of the speed of the wave, the speed of the elastic wave shown in the above equations (4), (5) and (6) increases at the beginning and the end of cutting of a work piece M1, for the elastic modulus of a machine tool M2 is added to that of the work piece M1. Therefore, the value of AE grows and accordingly the output signal of the AE sensor M3 increases.

Figure 13:
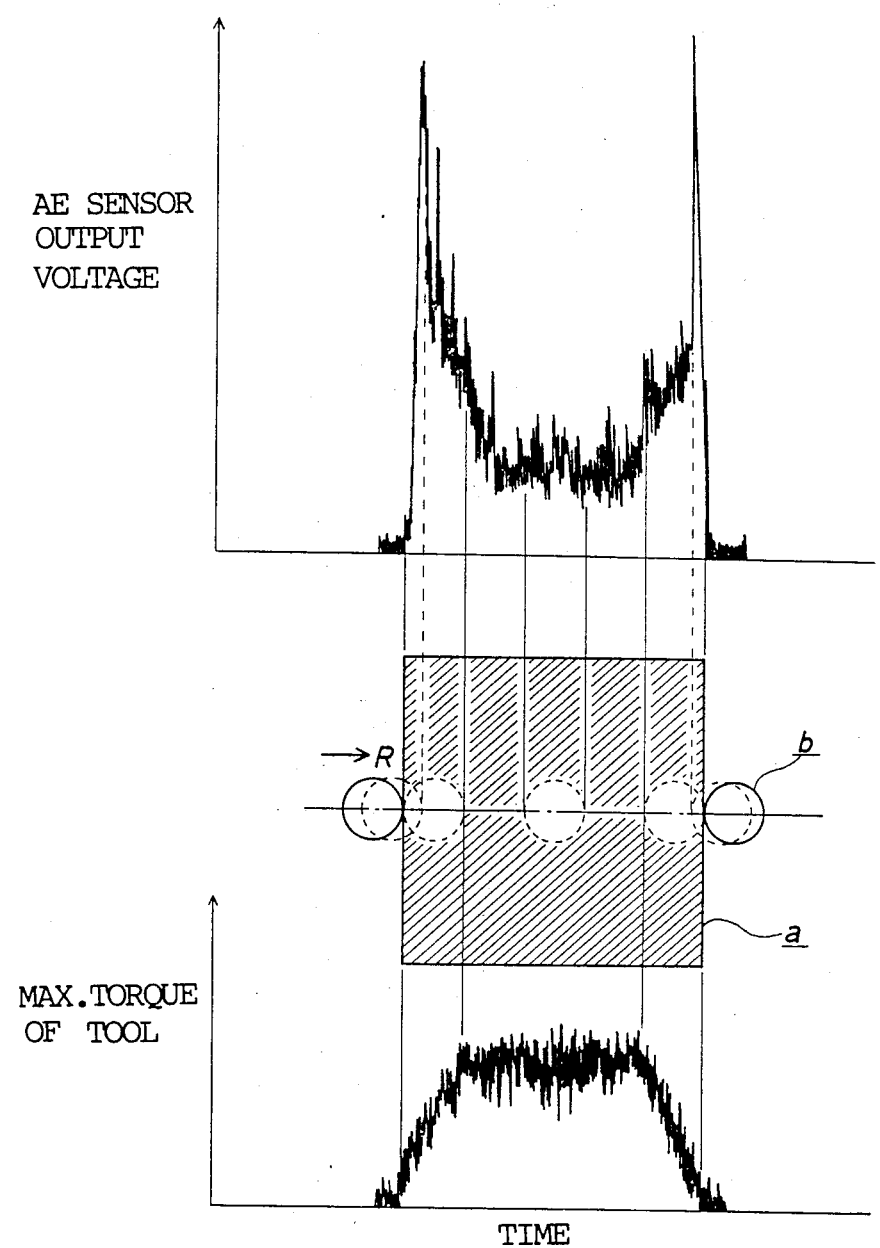
FIG. 13 is a diagram indicating generation of the acoustic emission (AE).

The abovementioned state is illustrated in a diagram of FIG. 13 which denotes a comparison between the output voltage of the AE sensor and the output torque of the tool b when a work piece a is machined by a tool (ball end mill) b from its left side in the direction of arrow R. As clearly shown by the figure, the output value of the AE sensor increases at the engagement and the disengagement of machining, but the output torque of a tool is not influenced by such a momentary change. However, it is known that defects of tools are apt to be generated at the engagement and the disengagement of machining. Namely, defects within a work piece M1 are apt to be generated and spread concentrically near the cutting position when cutting clips are produced by machining a work piece M1, thereby a strong acoustic emission is generated. Furthermore, under the same machining condition described above, the speed of the elastic wave is raised at the engagement and the disengagement of machining. On the basis of the abovementioned two points, it is required to instruct and control the machining condition including the feed speed for leveling the machining load, i.e., for keeping the machining load almost constant, in regard to machine tools featuring continuously changeable machining load such as simultaneously 3- or 5-axis controlled machining for molds or the like.

To cope with this condition, the signal processing circuit M8 for processing signals sent from the AE sensor M3 shows the following constitution. First, output signals from the AE sensor M3 are filtered by the band-pass filter M4 through which only the element of frequency band corresponding to the acoustic emission can pass, and the so-called noise element is eliminated. As a result, the S/N ratio is raised and then the signal is rectified by the rectification circuit M5. Since the acoustic emission is detected as a wave, its strength can be clearly reflected by the amplitude. The acoustic emission is then transformed into the amplitude signal based on the amplitude by the rectification of M5 and the action of the peak detection circuit M6. While the half-wave rectification is allowable, the full-wave rectification is more desirable for detecting the change of the acoustic emission in high responsibility. The peak of the signal rectified, by the rectification circuit M5 is detected by the peak detection circuit M6, and it is transformed into a direct current signal which is reflective of the amplitude of the peak. The output signal of the peak detection circuit M6 is smoothed by the smoothing circuit M7 and formed into a signal without the influence of noises which are sporadically superposing upon the AE signal. In the present invention, therefore, at least one AE sensor M3 is utilized, and the amplitude of the acoustic emission, i.e., the machining load for a work piece M1, is detected by the output signal of the smoothing circuit M7, i.e., the output signal of the signal processing means M8. Especially in case that changes are found in the machining load, they are detected by the abovementioned output signal in high accuracy and responsibility, which enables the feed control for high-speed machining. Moreover, the machining of a work piece M1 by a machine tool M2 can be stably controlled in high speed if the discrimination of machining state and the machining condition including the feed speed and cutting depth in the next and after processes are instructed and controlled by utilizing the abovementioned signal.

The machine tool M2 for machining a work piece M1 may be a milling machine such as a ball end mill or a roughing end mill for milling metal molds fixed on a flat table which is movable in both the directions of X-axis and Y-axis, or a face milling machine or a drilling machine. The present invention is also available for a multi-axis machining center, a compositive system including a variety of cutting functions.

The acoustic emission sensor M3 detects vibration ranging from within several tens KHz to hundreds KHz, and generally utilizes a piezoelectric element. As the frequency of acoustic emission varies in accordance with the difference of material of a work piece M1 or the type of a machine tool M2, the frequency band detected by the acoustic emission sensor M3 should be selected in accordance with the condition of a machine tool M2 controlled by the high-speed machining controller of this invention. While the AE sensor can be attached to either the work table of the machine tool M2 or the work piece M1, it is better to attach it to the work table, for there is no need to attach and demount the sensor when the work piece is changed.

Although only one AE sensor is enough, plural sensors can be used for realizing more precise control. The present invention has an advantage in that the constitution as a whole can be simplified by employing only one AE sensor.

The signal processing means M8 may include some different modes as follows.

In the first mode, the peak detection circuit M6 is made up of the peak follow circuit for successively pursuing the peak values of the output signal of the rectification circuit M5, which enables precise detection control.

In the second mode, the peak detection circuit M6 is formed by an envelope circuit comprising a simple RC circuit. As the peak value of the output signal of the rectification circuit M5 are successively pursued, the amplitude of the acoustic emission can be accurately detected, which enables the preferable control corresponding to the detected data.

In the third mode, the peak detection circuit M6 is formed by a sample hold circuit with a switching means for controlling te operation of switching ON and OFF the circuit in the same cycle as that of the pulse signal outputted from the rectification circuit M5. In this mode, the peak values of the output signal of the rectification circuit M5 are successively pursued. The abovementioned ON/OFF control of the switching means may be performed by means of a circuit in which the AE signals are successively sampled at a certain frequency level considering the frequency elements of the AE signal and the peak value is determined. The determined peak value is retained until the following AE signal is sampled and it has a higher peak value. It may be practiced by the circuit in which the AE signal is maintained in the "ON" state, when the value of the AE signal is differentiated to be zero (the AE signal is at its peak point) or during the period since the AE signal surpassed a preset voltage level until it falls below the level.

In fourth mode, the smoothing circuit M7 is formed by a low-pass filter in the second mode. The noise element superposing on the AE signal is eliminated by passing signals of low frequency band outputted from peak detection circuit M6.

In the fifth mode, the band-pass filter M4 in the signal processing circuit M8 is constructed so as to pass the output signals of the frequency band ranging from 10 KHz to 40 KHz and 80 KHz and over.

The cutting condition discrimination means M9 and the control means M10 function to discriminate the machining condition, e.g., the actual cutting and non-cutting or the deterioration of the cutting condition because of the entwined curly chips or the abrasion of a tool, thereby the suitable cutting condition is instructed to the machine tool M2 and controlled. It may be possible to directly control the cutting condition including feed speed, cutting depth, rotating speed, and the quantity of cutting oil. Also, it is possible to instruct and control the abovementioned conditions by a signal for correcting the preset cutting condition of a machine tool M2, e.g, an override signal against the feed speed.

The cutting condition discrimination means M9 functions to compare the amplitude of the acoustic emission with a predetermined reference value for deciding if the present cutting condition is actual cutting or non-cutting. The control means M10 functions to decrease the feed speed instructed to and controlled by the machine tool M2 when the cutting condition of a work piece M1 is changed from non-cutting to actual cutting.

The cutting condition discrimination means M9 compares the amplitude of the acoustic emission with a predetermined reference value for discriminating extraordinary machining conditions of a work piece M1, and judges if something is wrong with the machining condition. The control means M10 functions to instruct and control the machine tool M2 to prohibit the cutting feed when the cutting condition is judged to be abnormal.

Furthermore, the cutting condition discrimination means M9 functions to compare the amplitude of the acoustic emission with the first reference value for discriminating a high-load cutting condition of a work piece M1 and the second reference value for discriminating a low-load cutting condition to judge the machining condition of the work piece M1. When the cutting load proved to be higher than the first reference value, the feed speed and/or the cutting depth instructed to the machine tool M2 can be decreased by the control means M10, and likewise in the case when the cutting load proves to be lower than the second reference value, the feed speed and/or the cutting depth can be increased.

The machine tool M2 is equipped with a number of tools which are automatically exchangeable according to various cutting conditions. The cutting condition discrimination means M9 can be constructed so as to judge the condition of the work piece M1 by comparing the amplitude of its acoustic emission with a preset reference value for each cutting tool of the machine tool M2.

While each of the cutting condition discrimination means M9 and the control means M10 mentioned above can be respectively realized in a discrete circuit, it is also possible to incorporate the two means as a logical calculation circuit by utilizing a microcomputer. In the latter case, the abovementioned each means can be realized in accordance with the predetermined processes and judgement.

Figure 1:
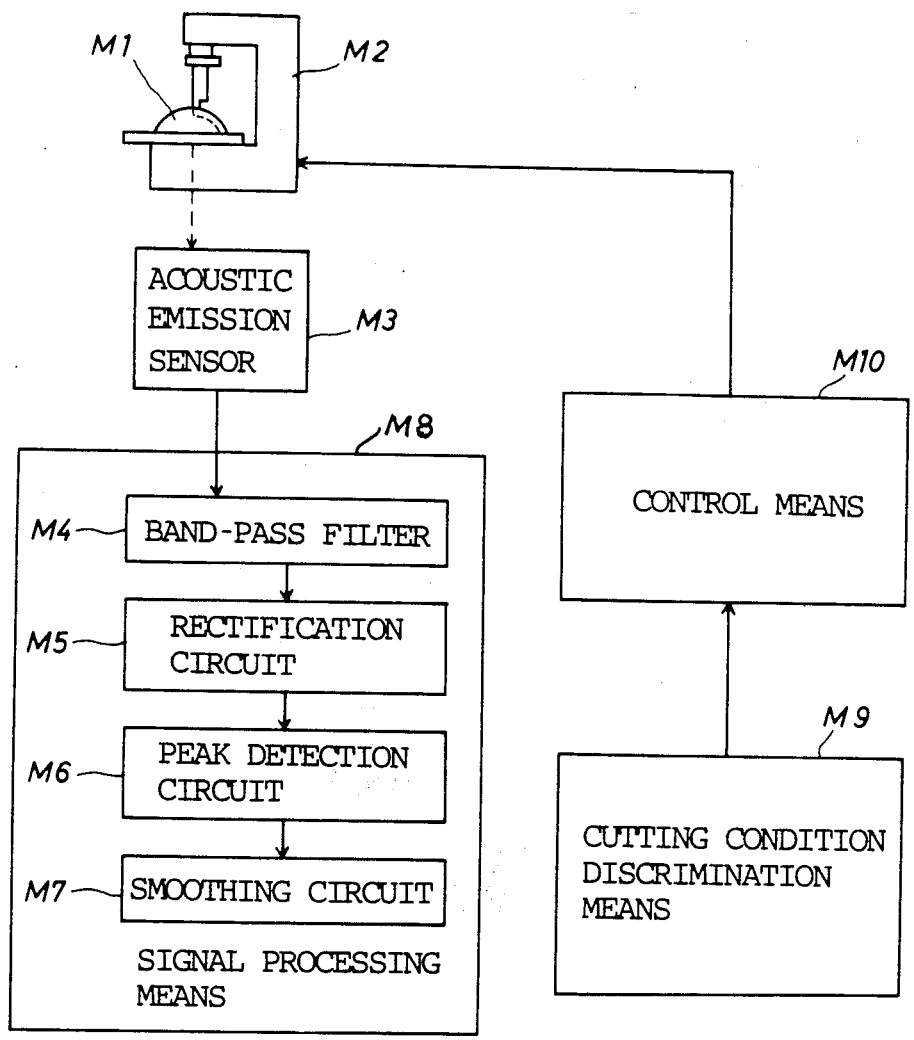
FIG. 1 shows a fundamental constitution of the present invention.
Figure 2:
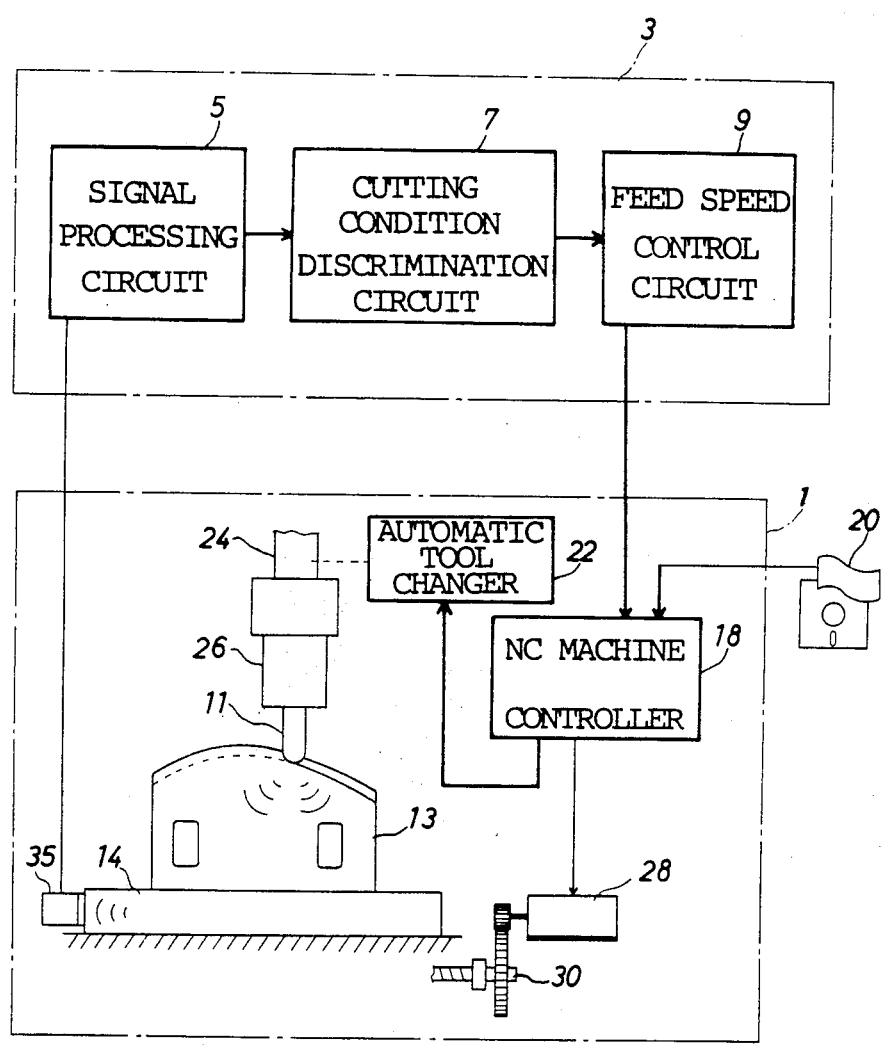
FIG. 2 gives an outline of the constitution of the first embodiment.

FIG. 2 shows an outline of the constitution of the first embodiment. In this figure, numerals 1 and 3 illustrate a numerically controlled (NC) ball end mill and a high-speed machining controller, respectively. The high-speed machining controller 3 is equipped with a signal processing circuit 5, a cutting condition discrimination circuit 7 and a feed speed control circuit 9. The present embodiment is making a point of the feed speed (feed amount) among various machining conditions and functions to control it.

In this embodiment, a ball end mill is employed as a machine tool. This ball end mill has a plurality of cutting tools 11 which are rotatable in high speed for cutting metal molds by shifting a work table 14 with a metal mold 13 in the direction of each axis. Such a fundamental machining control is practiced by an NC machine tool controller 18. this controller 18 memorizes the cutting processes in accordance with the cutting pattern and the material of the mold 13, e.g., the type of the cutting tool 11, the course of cutting and the machining speed, by reading in advance the data written on a punched paper tape or a magnetic disk 20. Therefore, the machining can be performed by controlling an automatic tool changer 22, selecting one of the cutting tools 11 fixed by a tool fixation device 25 via an attachment 24, controlling the position of a work table 14 via a feed screw 30 by driving a motor 28 for transmitting a feed to each axis, and also controlling the feed speed and the cutting depth, in accordance with the abovementioned cutting processes.

On the other hand, the acoustic emission sensor (AE sensor) 35 formed at the side surface of a work table 14 is interfaced with the signal processing circuit 5 of the high-speed machining controller 3 via lead wires. The high-speed machining controller 3 instructs the feed speed to the NC machine tool controller 18 via the feed speed control circuit 9 after processing the signals sent from the AE sensor and discriminating the cutting condition by means of the cutting condition discrimination circuit 7. Namely, the high-speed machinining controller gives the control command (override signal) to increase, hold or decrease the feed speed or to stop the cutting feed in accordance with the amplitude of acoustic emission on the basis of the feed speed which is predetermined by the shape and the material of the mold 13 and read out via a punched tape 20. The stop command is outputted in a case of emergency such as extraordinary increase of tool damage, the entanglement of cutting chips, etc.

Figure 3:
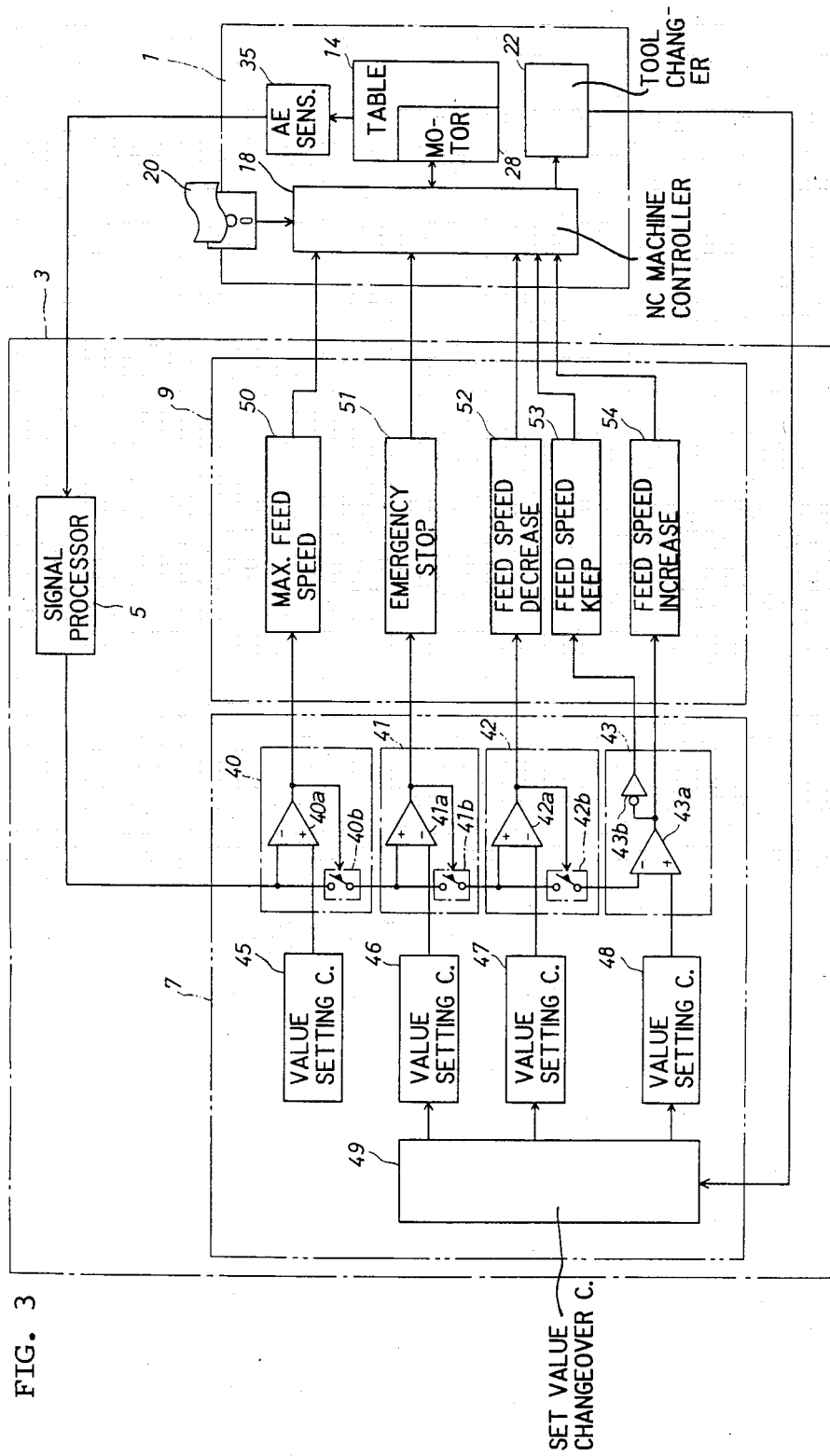
FIG. 3 is a block diagram indicating an internal constitution of a high-speed machining controller 3 in detail.

The constitution of the high-speed machining controller 3 is hereinafter described on the basis of FIGS. 3 and 4. FIG. 3 is a block diagram illustrative of a control system concerning the constitution of the high-speed machining controller 3. As shown in the figures, the acoustic emission is detected by the AE sensor 35 formed at a work table 14 of a ball end mill 1, and then the signal is processed by the signal processing circuit 5. In the AE sensor 35, a piezoelectric element at a resonance frequency of 170 KHz is utilized. The vibration frequency band in which the acoustic emission generated during machining is mostly reflective, ranges from within several tens KHz to 800 KHz. Especially in the range from 40 KHz to 80 KHz, noises are easily superposed. Such noises are attributable to the movement of a work table 14 and a tool holding member 26, conveyance of a heavy work piece or the operations of arc welding machine, crane, and other machine tools. In order to eliminate these noises and realize a higher S/N ratio for detecting acoustic emission, the signal processing circuit 5 is utilized.

Figure 4:
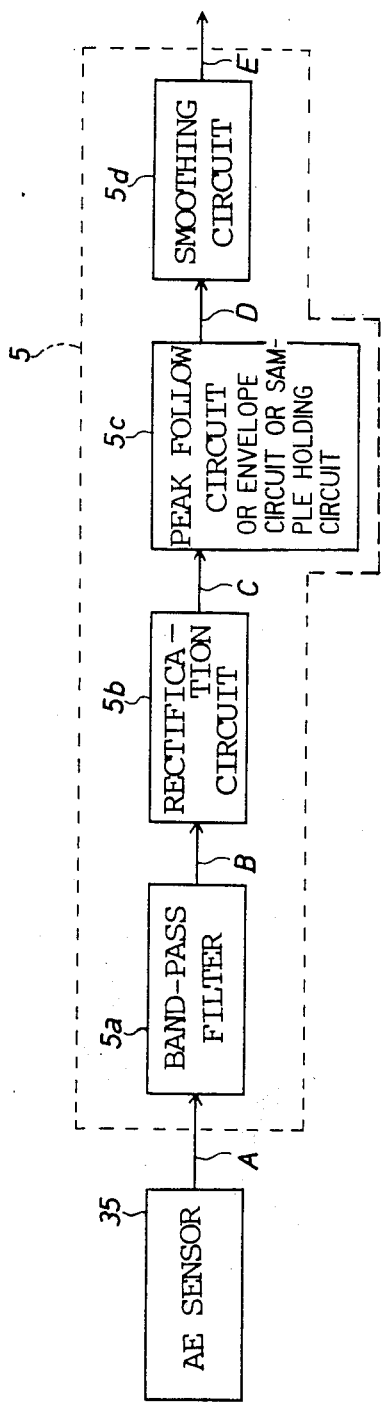
FIG. 4 is a block diagram which shows the constitution of the signal processing circuit of the abovementioned controller.
Figure 5C:
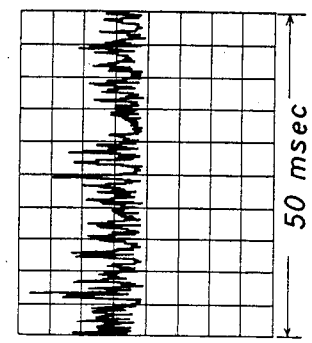
FIGS. 5(A), (B), (C), (D), (E) and (F) respectively shows a state of signal processing.
Figure 5B:
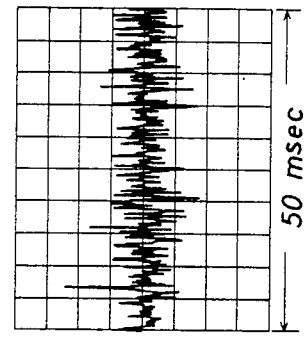
Figure 5A:
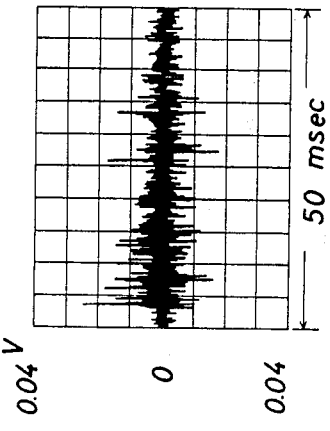
Figure 5F:
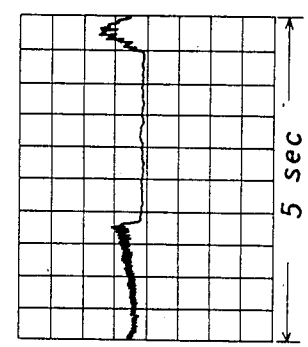
Figure 5E:
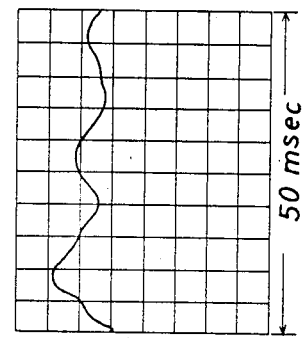
Figure 5D:
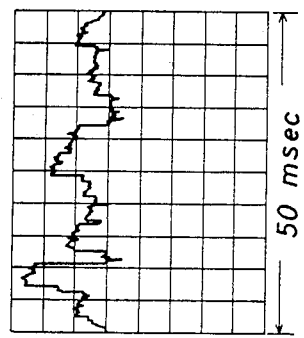

As shown in FIG. 4, the signal processing circuit 5 is composed of a band-pass filter 5a, a rectification circuit 5b, a peak follow circuit 5c and a smoothing circuit 5d. the band-pass filter 5a allows the signal S1 in the frequency band ranging from 10 KHz to 40 KHz and the signal S2 in over 80 KHz to pass through the filter for the purpose of eliminating the abovementioned noises. FIGS. 5(A) and 5(B) respectively shows an example of the output signal of the AE sensor 35 and the signal after passed through the band-pass filter 5. Nextly, the output signal of the band-pass filter 5a is full-wave rectified (FIG. 5(C)) by the rectification circuit 5b. In the peak follow circuit 5c, the peak values of the signal after processed by the full-wave rectification is held and transformed into a direct current signal in a rectangle form just like made by linking the peak valves of the signal (FIG. 5(D)). The output signal of the peak follow circuit 5c is smoothed by the smoothing circuit 5d (FIG. 5(E)), and outputted to the cutting condition discrimination circuit 7. Thus, the signal reflecting only the acoustic emission (AE signal) is extracted from the output signal of the AE sensor 35 composed of piezoelectric elements. FIGS. 5(A), (B), (C), (D) and (E) respectively illustrates the output signal of each circuit A, B, C, D and E in FIG. 4. FIG. 5(F) shows the output signal of the signal processing circuit 5, in the condition that the time scale is miltiplied by a hundred times in comparison with FIGS. (A) thru (E).

Figure 6:
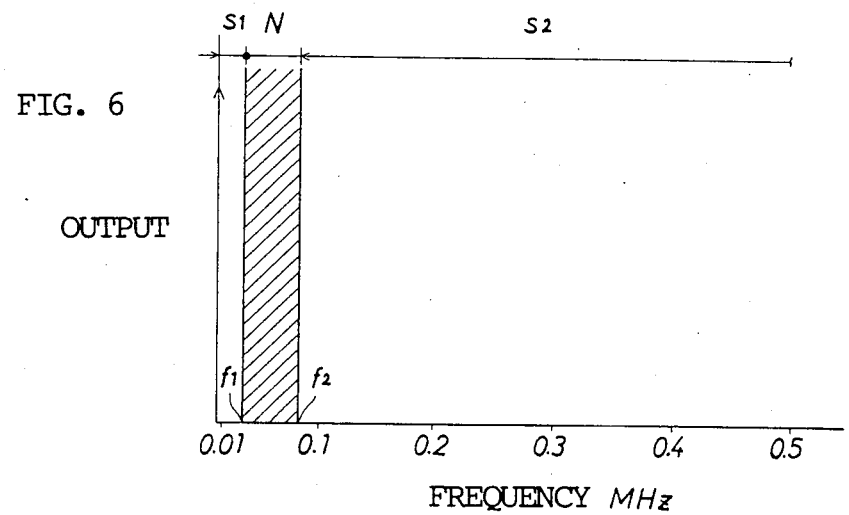
FIG. 6 is a diagram indicating an operational sphere of a band-pass filter.

As mentioned in the above, the signal processing circuit 5 of this invention eliminates the signals below 10 KHz and in the range of 40 KHz thru 80 KHz by means of the band-pass filter 5a. This is clearly shown in FIG. 6, that is, the signals S1 within the range of 10 KHz thru 40 KHz and the signals S2 over 80 KHz are processed as effective signals and the signals N within the range of 40 KHz thru 80 KHz are eliminated as noise elements. In FIG. 6, a mark f1 denotes a point of 40 KHz and a mark f2 denotes a points of 80 KHz.

Figure 7:
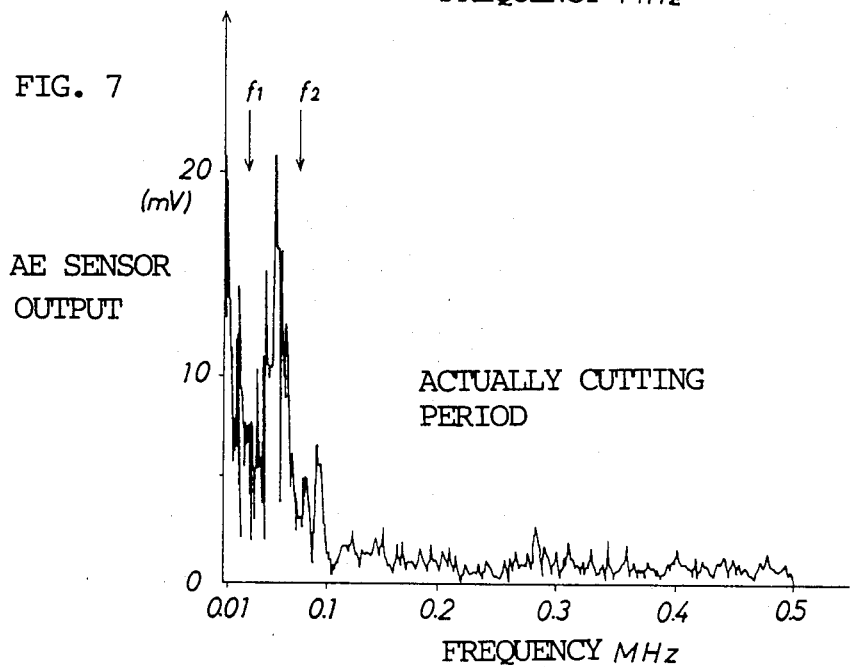
FIG. 7 is a diagram illustrative of signals detected by the acoustic emission sensor 35 during actual cutting period.
Figure 8:
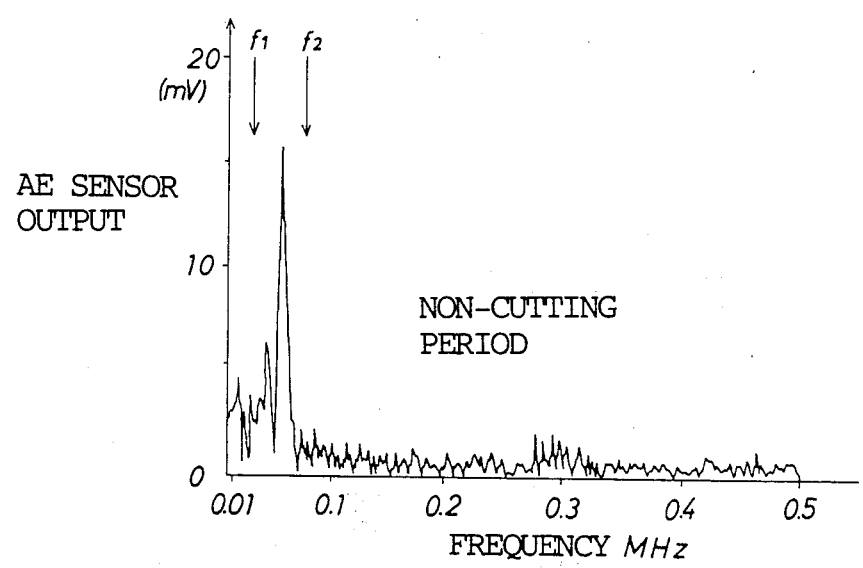
FIG. 8 shows a diagram illustrative of signals detected by the acoustic emission sensor 35 during non-cutting period.

FIG. 7 and FIG. 8 respectively shows the signal detected by the AE sensor 35 during actual cutting and non-cutting period. In the comparison between FIG. 7 and FIG. 8 by eliminating a frequency band in the range of f1 thru f2, it is understood that the machining load is clearly reflected in the output signal of the AE sensor 35.

In respect to FIG. 3, the constitutions of the cutting condition discrimination circuit 7 and the feed control circuit 9 are hereinafter described. The cutting condition discrimination circuit 7 functions to compare the output signal of the AE sensor 35 processed by the signal processing circuit 5, i.e., the signal which is accurately reflecting the amplitude of the acoustic emission (AE signal), with the predetermined reference values or the max./min. values of the comparative circuits 40, 41, 42 and 43. First, the AE signal is inputted into the first comparative circuit 40, and compared with the non-cutting comparative signal V1 (10 mV in this embodiment) outputted from a non-cutting/actual cutting discrimination value setting circuit 45 for discriminating between non-cutting and actual cutting. If the AE signal is smaller than the non-cutting comparative signal V1, the cutting condition is judged to be non-cutting, and the output of a comparator 40a becomes high-active. On the other hand, if the AE signal is larger than the comparative signal, the cutting condition is judged to be actual cutting, and a switch 40b in the comparative circuit 40 is switched 'ON' and the AE signal is outputted in the second comparative circuit 41 without causing the output from the comparator 40a to be active.

In the second comparative circuit 41, the AE signal is compared with the extraordinary load comparative signal V2 (22 mV in this embodiment) outputted from the extraordinary load discrimination value setting circuit 46 by a comparator 41a, for deciding if the cutting condition is in an extraordinary state. In case the edge of the cutting tool 11 is damaged, the AE signal becomes extraordinarily high. By detecting this, the output of the comparator 41a becomes high-active. If the AE signal is smaller than the extraordinary load comparative signal V2, a switch 41b is switched 'ON' as in the first comparative circuit 40, and the AE signal is outputted into the third comparative circuit 42.

In the third comparative circuit 42, the judgment to decide if the AE signal surpasses the supremum comparative signal V3 (18 mV in this embodiment) outputted from a supremum value setting circuit for leveling cutting load 47 is performed. As same as in the second comparative circuit 41, the output of a comparactor 42a becomes high-active state when the AE signal is in excess of the supremum compartive signal V3. Otherwise, a switch 42b is switched on, and the AE signal is outputted into the fourth comparative circuit 43.

The fourth comparative circuit 32 includes a comparator 43a and an inverter 43b, and compares the AE signal with the infimum comparative signal V4 (15 mV in this embodiment) outputted from an infimum value setting circuit for leveling cutting load 48. If the AE signal is smaller than the infimum comparative signal V4, the output of the comparator 43a becomes highactive, otherwise the output of the inverter 43b becomes high-active state.

The switches 40a thru 42a installed in the abovementioned comparative circuits 40 thru 42 enable a delayed operation of hundreds of μsec. for preventing incorrect control instructions caused by the reversal of the output of each comparative circuit because of noises. In this embodiment, a set value changeover circuit 49 is formed in the cutting condition discrimination circuit 7 for setting the values of the extraordinary load comparative signal V2, the supremum comparative signal V3, and the infimum comparative signal V4 as corresponding to each different tool. The comparative signals V2 thru V4 in the comparative circuits 41 thru 43 are changed in accordance with the operation of the automatic tool changer 22.

The followings are the explanations of the feed speed control circuit 9. When the output signals of the comparative circuits 40 thru 43 in the cutting condition discrimination circuit 7 are inputted into the feed speed control circuit 9, it functions to output an override signal to the NC machine tool controller 18 installed in the ball end mill 1. The feed speed control circuit 9 is composed of a max. feed speed command circuit 50, an emergency stop command circuit 51, a feed speed decrease command circuit 52, a feed speed keep command circuit 53 and a feed speed increase command circuit 54. Each circuit operates as follows:

Max. feed speed command circuit 50: when the output of the first comparative circuit 40 in the cutting condition discrimination circuit 7 is in high-active state, that is, when the cutting condition is judged to be non-cutting condition, it gives an instruction to the NC machine tool controller 18 to increase the feed speed up to the maximum.

Emergency stop command circuit 51: when the output of the second comparative circuit 41 in the cutting condition discrimination circuit 7 is in high-active state, that is, when the AE signal is larger than the extraordinary load comparative signal V2 (22 mV), thereby the extraordinary condition such as tool damage is detected, it gives an emergancy stop command to the NC machine tool controller.

Feed speed decrease command circuit 52: when the output of the third comparative circuit 42 is in highactive state, that is, the AE signal is judged to be larger than the supremum comparative signal V3 (18 mV) and the cutting load exceeds the supremum of leveling, it gives a command to the NC machine controller 8 to decrease the override signal of feed speed (magnification of less than 1) to level the cutting load.

Feed speed hold command circuit 53: when the AE signal is judged to be larger than the infimum comparative signal V4 (15 mV) by the comparator 43a in the fourth comparative circuit 43, that is, the cutting load is within the leveling range (V4<V3) and the output of the inverter 43b is in high-active state, it gives a command to the NC machine controller to hold the override signal so as to maintain the present feed speed.

Feed speed increase command circuit 54: when the output of the comparator 43a in the fourth comparative circuit 43 becomes high-active state, that is, the AE signal is lower than the infimum comparative signal V4 (15 mV) and a surplus is left in the cutting load, it gives a command to the NC machine controller 18 to enlarge the override signal (magnification of over 1) so as to increase the feed speed.

Figure 9:
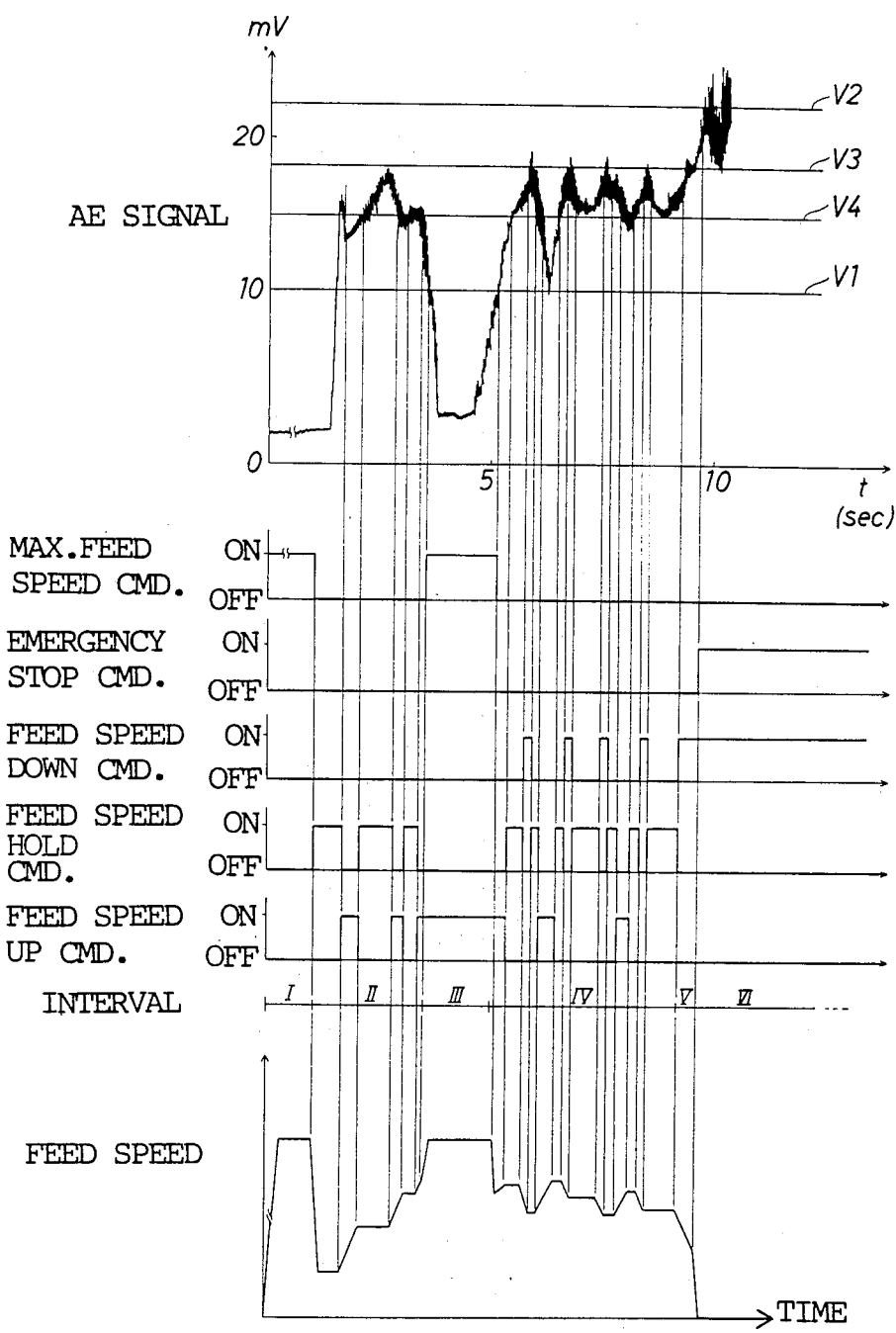
FIG. 9 is a timing chart indicating an example of the cutting feed control of the first embodiment.

FIG. 9 illustrates the state of controlling feed speed by the abovementioned cutting condition discrimination circuit 7 and the feed speed control circuit 9. Since the level of the AE signal is lower than that of the non-cutting comparative signal V1 at the beginning of cutting, the cutting condition is judged to be within the range of non-cutting, thereby the max. feed speed command is transmitted to the controller. At this time, the NC machine controller 18 is set to feed the tool to the point just short of the starting point of cutting at the max. feed speed (FIG. 9, block I) on the basis of the cutting form of the metal mold 13 which has been read in advance from the punched tape 20. After that, the feed speed is controlled at a slow speed (approach speed) until the tool reaches the starting point of cutting. When the cutting is started and a high-level AE signal is detected, the feed speed is controlled to be increased or maintained as according to the AE signal (FIG. 9, block II).

In case the cutting load becomes smaller than the non-cutting comparative signal V1 because of the form of the mold 13, the feed speed is increased again up to the max. speed (block III). When the actual cutting is started, the AE signal is compared with the infimum comparative signal V4 and the supremum comparative signal V3 so as to set a preferable feed speed by increasing, keeping or decreasing the speed (block IV). As a result, the cutting load is leveled within a certain range.

In case the edge of the tool 11 is destroyed or worn away, thereby the cutting load is rapidly increased, firstly the feed speed is decreased (block V). When the level of the AE signal surpasses the extraordinary load comparative signal V2 (22 mV) due to the increase of the cutting load, the emergency stop command is transmitted to the NC machine controller 18, and the cutting feed is suspended (block VI). At this time, the exchange or the removal of a tool may be enabled by the NC machine controller as occasion demands.

By utilizing the present embodiment with the abovementioned constitutions, the cutting condition is accurately discriminated and the feed speed is controlled for realizing an ideal cutting, since the amplitude of the acoustic emission is detectable in high accuracy and responsibility by processing signals detected by the AE sensor 35 installed in the work table 14. Namely, in the signal processing circuit 5 of this embodiment, noises are eliminated and the peak values of the AE signal are pursued after full-wave recification, therefore, delay or dull transition of the signal because of the integral operation seldom happens and the amplitude of the acoustic emission can be detected in high responsibility and accuracy.

Figure 10A:
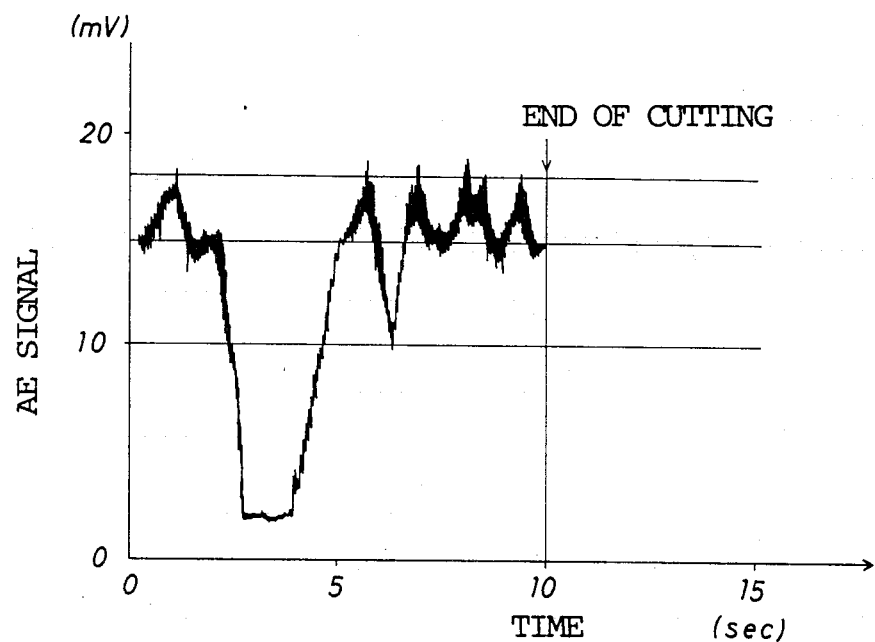
FIGS. 10(A) and (B) are diagrams used for a comparison of the cutting condition between the first embodiment and the prior art.
Figure 10B:
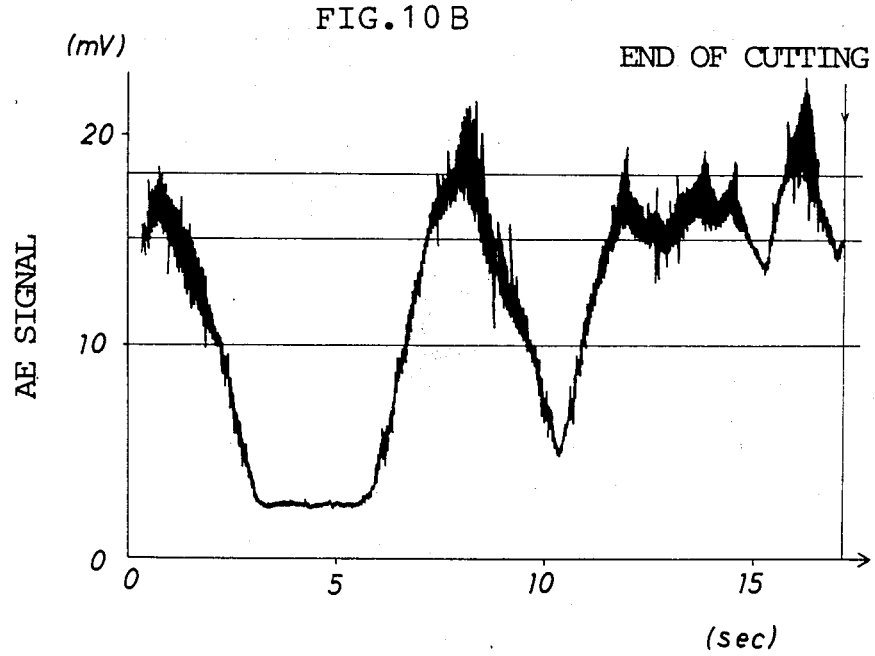

By utilizing the acoustic emission, therefore, the discrimination of the cutting condition, especially the condition required for controlling the feed speed, can be precisely performed. As already shown in FIG. 13, the tool damage seldom occurs in a stable machining condition while the cutting torque is relatively high. The tool defect is apt to occur when the AE becomes larger at the beginning and the end of cutting. Because of this, the high speed machining can be realized by controlling the feed speed corresponding to the AE signal so as to keep the cutting load almost constant without accompanying tool damages. FIGS. 10(A) and (B) are diagrams illustrative of the abovementioned matter by comparing the same cutting patterns between the present embodiment and the prior art. FIG. 10(A) shows the former and FIG. 10(B) the latter. It is understood from the figures that the machining speed can be almost doubled by utilizing the present embodiment.

In addition, since the leveling of the machining load is accomplished, life of the tool 11 is prolonged and also life of each tool is regularlized, thereby the maintenance of the tool 11 becomes easier. Furthermore, as an extraordinary cutting condition can be detected at an initial state by using the AE signal and accordingly the cutting feed can be suspended, a defective machining of the metal mold 13 because of damage or abrasion of a tool edge or entanglement of chips can be prevented. The work efficiency can be remarkably improved because there is no need for an operator to pay attention to the occurrence of an accident all the time during machining.

The abovementioned various effects can be obtained even through a work piece is constructed form different materials or made of several types of materials. For example, in case a ductile work piece (steel) is included in sick work piece (cast metal), the machining is practiced on the basis of the cutting condition lying in between the conditions for both materials. Because of this, string-like chips are apt to be produced when the tool cuts into steel. In this case, a high load is generated at the tool edge, and the cutting temperature increases, and string-like chips are produced due to the generation of the acoustic emission. The high-speed machining controller of this embodiment realizes a preferable machining corresponding to the difference of materials by changing the cutting condition such as cutting feed speed in high responsibility in accordance with the amplitude of the acoustic emission. Moreover, there is no need to adjust the AE sensor 35 as changing the metal mold 13, for the AE sensor 35 is fixed at the side surface of the work table. Since the AE sensor is hard to be affected by scattering of cutting oil or chips, the cutting condition is detected in high stability and accuracy.

Furthermore, various command signals for controlling the feed speed of the tool 11 are directly transmitted to the NC machine controller 18, accidents with which an operator sometimes meets at the beginning and the end of machining by a ball end mill 1 can be prevented. Since the override signal of the NC machine controller 18 is transmitted from the outside for controlling the feed speed, the existing NC machine controller can be available by remodeling a few points.

Figure 11:
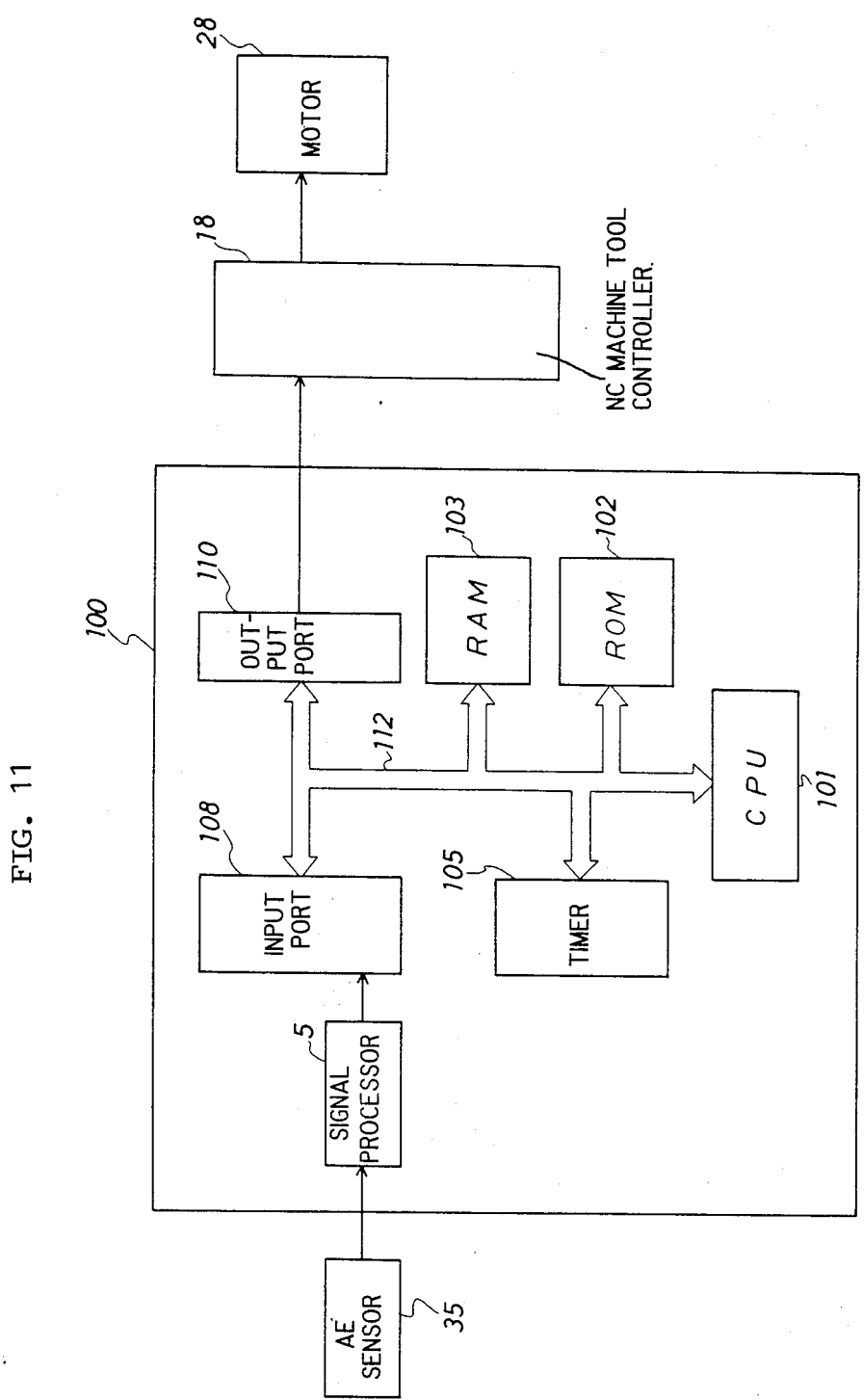
FIG. 11 is a block diagram illustrative of an outline of the constitution of the second embodiment.

The second embodiment of this invention is hereinafter described. FIG. 11 is a block diagram illustrative of a constitution of the second embodiment. In this figure, the constitutions of an AE sensor 35, an NC machine tool controller 18, and a motor for the feed of each axis 28 are the same as those of the first embodiment. Numeral 100 denotes an electronic control circuit acting as a high-speed machining controller constituted as a logical operation circuit. It is composed of a CPU 101, a ROM 102, a RAM 103, a timer 105 which are widely known, and an input port 108 and an output port 110 which are interfaced with each other via a common bus 112. At the input port 108, the AE signal is inputted by means of a signal processing circuit 5 for amplifying or wave-shaping or eliminating noises from a feeble analog signal sent from the AE sensor 35 as same as in the first embodiment. Then, the AE signal is converted from analog to digital readable by the CPU 101. At the output port 110, the analog signal as an override signal is outputted into the NC machine controller 18.

Figure 12:
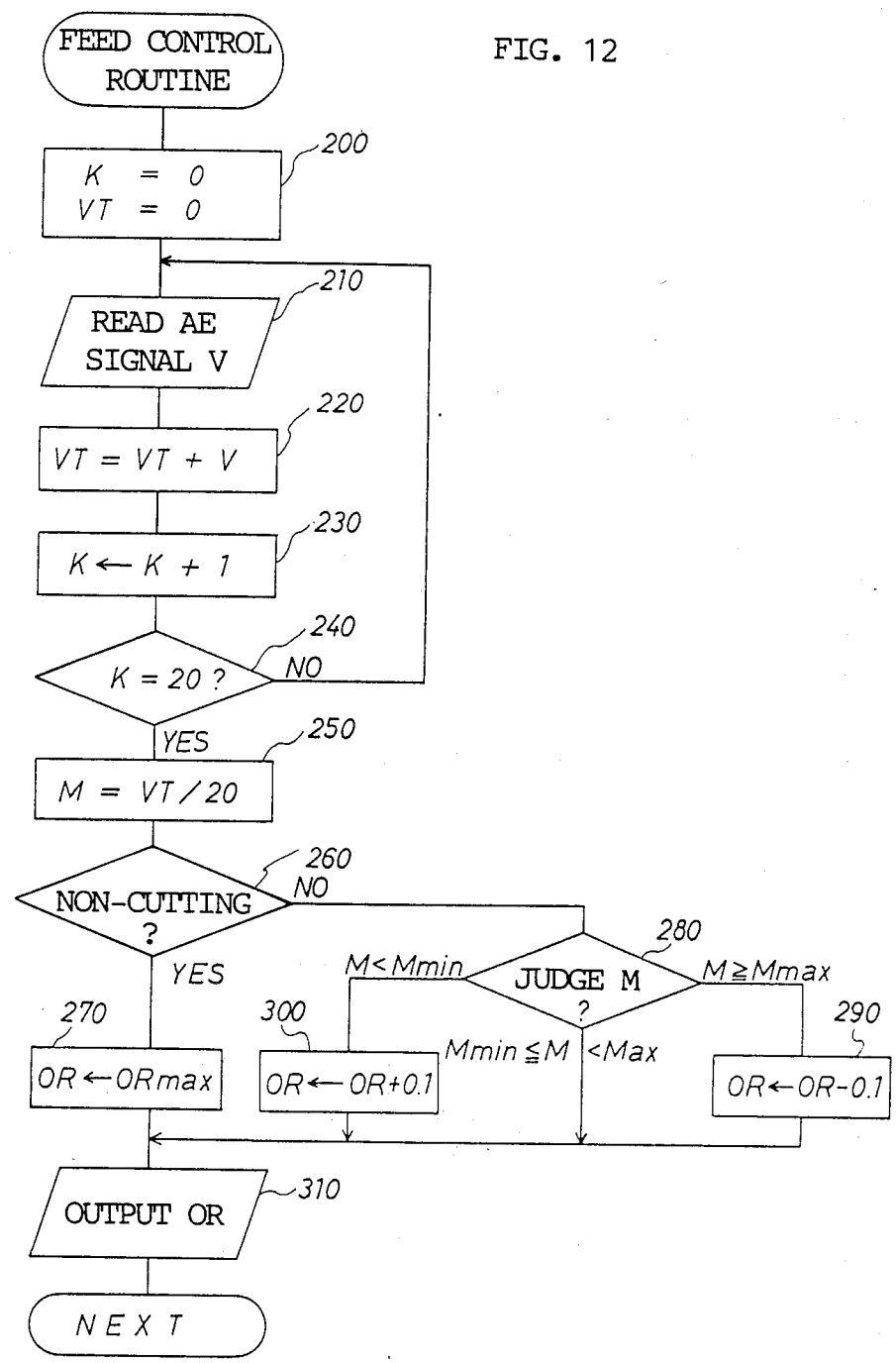
FIG. 12 is a flow chart indicating a control routine of the second embodiment.

In the second embodiment, the machining condition discrimination means and the control means are realized by the operations of discrimination and judgment in accordance with the program previously stored in the ROM 102. The processings executed in this embodiment are explained based on the flow chart in FIG. 12.

The feed control routine is repeated during machining as follows. First, at step 200, variables to be used in the calculations afterwards are initialized (K=O, VT=O). At step 210, the AE signal V converted from analog to digital in high speed is read via the input port 108. At step 220, the addition of the AE signal V (VT→VT+V) is performed. At step 230, the variable K is incremented by only 1, and determined if the value of K becomes 20 at step 240. If the result at step 240 proved to be 'NO', the processing goes back to step 210, and the processing and judgment of steps 210 thru 240 are repeated until the value of K becomes 20 (K=20). As a result of this, the variable VT includes the sum of AE signal V for twenty times.

At step 250, the variable VT is divided by 20 to calculate the mean value M of the AE signal. Since the speeds of A/D conversion and the repetition of processings at steps 210 thru 240 are fast enough, the value M of the AE signal without the influence of noises can be obtained in the processings of steps 210 thru 250.

At step 260, the present cutting condition is judged if it is within the range of non-cutting on the basis of the value M of the AE signal. When the value M of the AE signal proved to be very small and the cutting tool 11 is positioned at a little short of the point where the actual cutting is started in accordance with the cutting form of the metal mold 3 previously stored in the memory, the processing proceeds to step 270 where the override value OR is set at its max. value ORmax.

On the other hand, when the result of the judgment at step 260 proved to be out of the non-cutting range, the processing step is proceeded to step 280, where the judgment concerning the value M of the AE signal is executed. If the value M of the AE signal is greater than the supremum value Mmax, the processing proceeds to step 290 where 0.1 is subtracted from the override value OR (OR←OR−0.1). Contrariwise, if the value M of the AE signal is less than the infimum value Mmin, the processing proceeds to step 300 where 0.1 is added to the override value OR (OR←OR+0.1). If the value M is greater than the infumum value Mmin and less than the supremum value Mmax, the override value is not changed.

After the abovementioned processings are completed, the override signal in accordance with the override value OR which is updated or maintained at steps 270, 290 and 300 is outputted via the output port 110 to the NC machine controller 18 at step 310. After step 310, the processing exits to 'NEXT', and once the routine in concluded.

By utilizing the second embodiment with the abovementioned constitutions, various effects as same as those of the first embodiment excepting the emergency stop control can be obtained, thereby highly accurate and stable machining control can be realized. Since the abovementioned controls has been realized by the logical operation circuit in this embodiment, the freedom degree of machining can be improved by controlling the machining condition, e.g., by changing the judgment levels of steps 260 and 280 according to the type of machining, or by increasing/decreasing the update value (±0.1 in the second embodiment) of the override value OR used at step 290 and 300 in accordance with the type of metal mold 13.

Although two embodiments are introduced hereinbefore, numerous modifications and variations of the present invention are possible in the light of the above teachings. It is therefore to be understood that within the scope of the opened claims, the invention may be practiced otherwise than as specifically described herein. For example, this invention is available to other types of cutting machines such as a face milling machine or a roughing end mill.

What is claimed is:

1. A high speed machining controller for controlling a machine tool comprising:
    an acoustic emission sensor for detecting an acoustic emission generated from said machine tool by machining the workpiece;
    a signal processing means for processing an output signal of said acoustic emission sensor in order to detect an amplitude of the output signal, said signal processing means including,
        a band-pass filter for inputting a signal from said acoustic emission sensor and for passing a component of the inputted signal, the component having a frequency band corresponding to the acoustic emission,
        a rectification circuit for inputting a signal from said band-pass filter and for rectifying the inputted signal,
        a peak detection circuit for inputting a signal from said rectification circuit and for detecting peak values of the inputted signal, and
        a smoothing circuit for inputting a signal from said peak detection circuit, for smoothing the inputting signal and for outputting the smoothed signal as a signal corresponding to the amplitude of the acoustic emission;
    a cutting condition detection means for detecting cutting conditions of a system including said high-speed machine tool and the workpiece by comparing the detected amplitude of the acoustic emission with a predetermined reference value; and
    a control means for controlling machining condition of the system including at least a feed speed of the machine tool on the basis of the detected cutting condition.

2. A high-speed machining controller as claimed in claim 1, wherein said band-pass filter of said signal processing circuit functions to pass the signals in the frequency band ranging from 10 kHz to 40 kHz, and 80 kHz and over.

3. A high-speed machining controller as claimed in claim 1, wherein said peak detection circuit of said signal processing means includes a peak follow circuit for successively pursuing the peak values of the signal outputted from said rectification circuit.

4. A high-speed machining controller as claimed in claim 1, wherein said peak detection circuit of said signal processing means includes an envelope circuit for successively detecting peak values of the signal outputted from said rectification circuit.

5. A high-speed machining controller as claimed in claim 1, wherein said peak detection circuit of said signal processing means includes a sample holding circuit including a switching means for controlling ON/OFF command synchronously with the pulse of a signal outputted from said rectification circuit.

6. A high-speed machining controller as claimed in claim 4, wherein said smoothing circuit of said signal processing means includes a low-pass filter through which only the signal composed of low-frequency elements of the output signals from said peak detection circuit functioned as an envelope circuit can pass.

* * * * *